(12) United States Patent
Mandava et al.

(10) Patent No.: US 10,705,105 B2
(45) Date of Patent: Jul. 7, 2020

(54) ABSOLUTE SPEED DETECTOR

(71) Applicant: APPLIED CONCEPTS, INC., Plano, TX (US)

(72) Inventors: Mahendra Mandava, Richardson, TX (US); Robert S. Gammenthaler, Princeton, TX (US); Russell D. Kautz, The Colony, TX (US); Steven F. Hocker, Gardner, KS (US); Robert E. Jordan, Addison, TX (US); Devin L. Kautz, Melissa, TX (US)

(73) Assignee: APPLIED CONCEPTS, INC., Richardson, TX (US)

( * ) Notice: Subject to any disclaimer, the term of this patent is extended or adjusted under 35 U.S.C. 154(b) by 0 days.

(21) Appl. No.: 15/793,623

(22) Filed: Oct. 25, 2017

(65) Prior Publication Data

US 2019/0025336 A1    Jan. 24, 2019

Related U.S. Application Data

(60) Provisional application No. 62/535,711, filed on Jul. 21, 2017.

(51) Int. Cl.
*G01S 17/58* (2006.01)
*G01P 3/36* (2006.01)
(Continued)

(52) U.S. Cl.
CPC .............. *G01P 3/36* (2013.01); *G01P 3/44* (2013.01); *G01P 21/02* (2013.01); *G01S 7/4808* (2013.01);
(Continued)

(58) Field of Classification Search
CPC .......... G01P 21/02; G01S 17/58; G01S 17/88
See application file for complete search history.

(56) References Cited

U.S. PATENT DOCUMENTS 5,525,996 A    6/1996  Aker et al.
5,528,245 A    6/1996  Aker et al.
(Continued)

OTHER PUBLICATIONS

Vineet Mennon "What is the difference between angular speed and tangential speed in a circular motion?" Sep. 19, 2011, Physics Stack Exchange, https://physics.stackexchange.com/questions/14828/what-is-the-difference-between-angular-speed-and-tangential-speed-in-a-circular, pp. 1-6. (Year: 2011).*

*Primary Examiner* — Mohamed Charioui
*Assistant Examiner* — Christine Y Liao
(74) *Attorney, Agent, or Firm* — Jackson Walker LLP; Christopher J. Rourk; Thomas B. Hayes

(57) ABSTRACT

A system determines absolute speed of a moving object. In AM, time of flight data over a time period is processed to determine ranges between the system and the moving object. The system performs linear regression analysis on the collected ranges to calculate the radial velocity. The system measures angular swivel rate of the system to determine tangential velocity. From the radial velocity and tangential velocity, the absolute speed can be calculated by taking the square root of the addition of the square of the radial velocity and square of the tangential velocity. In MM, the system calculates object distance, i.e. distance in the direction of travel, by subtracting the square of a pre-determined perpendicular distance L, perpendicular to the direction of travel, from a square of line-of-sight distance R, and taking square root of the result. Absolute speed is determined by calculating the slope of modified linear regression curve-fit.

16 Claims, 3 Drawing Sheets

(51) Int. Cl.
*G06F 17/11* (2006.01)
*G01P 3/44* (2006.01)
*G01S 17/88* (2006.01)
*G01P 21/02* (2006.01)
*G01S 7/48* (2006.01)
*G01S 19/33* (2010.01)
*G01S 13/92* (2006.01)

(52) U.S. Cl.
CPC .............. *G01S 17/58* (2013.01); *G01S 17/88* (2013.01); *G01S 19/33* (2013.01); *G06F 17/11* (2013.01); *G01S 13/92* (2013.01)

(56) References Cited

U.S. PATENT DOCUMENTS

| | | | |
|---|---|---|---|
| 5,563,603 | A | 10/1996 | Aker et al. |
| 5,565,871 | A | 10/1996 | Aker et al. |
| 5,570,093 | A | 10/1996 | Aker et al. |
| 5,691,724 | A | 11/1997 | Aker et al. |
| 5,784,023 | A * | 7/1998 | Bluege ................. G01S 7/4815 342/104 |
| 6,026,674 | A | 2/2000 | Gammenthaler |
| 6,198,427 | B1 | 3/2001 | Aker et al. |
| 6,501,418 | B1 | 12/2002 | Aker |
| 6,580,386 | B1 | 6/2003 | Aker et al. |
| 6,646,591 | B2 | 11/2003 | Aker et al. |
| 6,744,379 | B1 | 6/2004 | Aker et al. |
| 6,831,593 | B2 | 12/2004 | Aker et al. |
| 6,853,314 | B1 | 2/2005 | Aker et al. |
| 7,038,614 | B1 | 5/2006 | Aker |
| 7,049,999 | B1 | 5/2006 | Aker |
| 7,057,550 | B1 | 6/2006 | Aker |
| 7,068,212 | B2 | 6/2006 | Aker et al. |
| 7,190,882 | B2 | 3/2007 | Gammenthaler |
| 7,218,271 | B2 | 5/2007 | Aker et al. |
| 7,227,494 | B2 | 6/2007 | Aker |
| 7,409,294 | B2 | 8/2008 | Mead et al. |
| 7,411,544 | B2 | 8/2008 | Aker et al. |
| 7,672,782 | B2 | 3/2010 | Mead et al. |
| 7,864,102 | B2 | 1/2011 | Aker |
| 8,125,622 | B2 | 2/2012 | Gammenthaler |
| 8,138,966 | B2 | 3/2012 | Aker |
| 8,378,884 | B2 | 2/2013 | Aker |
| 8,441,622 | B2 | 5/2013 | Gammenthaler |
| 8,610,881 | B2 | 12/2013 | Gammenthaler |
| 9,146,316 | B2 | 9/2015 | Gammenthaler |
| 9,406,145 | B2 | 8/2016 | Gammenthaler et al. |
| 9,482,751 | B2 | 11/2016 | Mandava et al. |
| 10,168,426 | B2 | 1/2019 | Gammenthaler et al. |
| 2004/0201765 | A1 | 10/2004 | Gammenthaler |
| 2008/0071476 | A1* | 3/2008 | Hoshizaki ............ G01C 21/165 701/472 |
| 2011/0241656 | A1* | 10/2011 | Piemonte ............... G01C 17/38 324/207.11 |
| 2013/0322697 | A1* | 12/2013 | Grindstaff ............... G06T 7/246 382/107 |
| 2014/0074424 | A1* | 3/2014 | Pham ...................... G01C 25/00 702/145 |
| 2014/0104594 | A1 | 4/2014 | Gammenthaler |
| 2016/0018523 | A1 | 1/2016 | Gammenthaler |
| 2017/0254895 | A1* | 9/2017 | Tong ..................... G01S 13/878 |
| 2019/0018129 | A1 | 1/2019 | Walker et al. |
| 2019/0025336 | A1 | 1/2019 | Mandava et al. |
| 2019/0025429 | A1 | 1/2019 | Mandava et al. |

* cited by examiner

ABSOLUTE SPEED DETECTOR

CROSS REFERENCE TO RELATED APPLICATION

This application claims priority to U.S. Provisional Patent Application No. 62/535,711, filed Jul. 21, 2017, entitled "Absolute Speed and Mapping Lidar," the entire contents of which are hereby fully incorporated herein by reference for all purposes.

TECHNICAL FIELD

The present disclosure relates generally to range/Doppler-measurement-based speed detection devices and, more specifically, to systems and methods used to improve upon determining absolute speed in such speed detection devices.

BACKGROUND

Speed detection devices and more specifically traditional Light Detection and Ranging (LIDAR) and Radio Detection and Ranging (RADAR) speed detection devices in which 2D information of range and speed is used, are inexpensive versions of their 3D/4D counterparts (that determine and use azimuth and (for 4D) elevation information as well), but suffer from less accurate detection when direction of the actual velocity of a moving object is not in a direct line of sight with the measuring device, i.e. the cosine effect results in under-reporting measurements. This is not a limiting factor in the more expensive 3D/4D counterparts. The speed detection device is, therefore, unable to determine the true absolute speed of a moving object.

The present disclosure, therefore, provides novel and non-obvious solutions that when used with these traditional detection devices result in the devices performing better so that they are more attractive from a commercial standpoint. For example, the handheld LIDAR traffic speed enforcement devices in the market report only the relative speeds without any cosine correction.

SUMMARY

A system is provided that can improve upon the accuracies of LIDAR or RADAR detectors wherein the improvement can have a significant impact on accurately determining speeding violations. The system can determine absolute speed, in addition to relative speed, of a moving object. In an AM mode, time of flight data over a time period can be processed to determine a plurality of ranges between the system and the moving object. The system can also perform linear regression analysis on the collected ranges to calculate the radial velocity. The system can also measure angular swivel rates of the system to determine tangential velocity. From the radial velocity and tangential velocity, the absolute speed can be calculated by taking the square root of the addition of the square of the radial velocity and square of the tangential velocity. In MM mode, the system can calculate object distance (D), i.e. distance in the direction of travel, by subtracting the square of a pre-determined perpendicular distance L, perpendicular to the direction of travel, from a square of measured line-of-sight R, determined from time of flight data, and taking square root of the result. Absolute speed can be determined by calculating the slope of a linear regression curve-fit based on a collection of D's over a measurement time interval.

In an embodiment, a system for determining the absolute speed of a moving object includes a storage resource and a processor communicatively coupled to the storage resource, wherein the processor executes application code instructions that are stored in the storage resource. The application code instructions cause the system to process a plurality of time of flight data over a measurement time interval. The application code instructions further cause the system to determine a plurality of ranges between the system and the moving object for each time of flight data. The application code instructions further cause the system to determine a linear regression curve-fit on the plurality of time of flight data over the measurement time interval to determine the radial velocity associated with the plurality of time of flight data over the measurement interval. The application code instructions further cause the system to determine a tangential velocity for each time of flight data over the measurement time interval. The application code instructions further cause the system to determine absolute speed from the plurality of ranges using the AM and MM methods described below.

In another embodiment, the application code instructions cause the system to determine tangential velocity from the plurality of ranges by causing the system to detect an angular swivel rate (dθ/dt) of the object-tracking system and multiply line of sight range by the angular swivel rate (dθ/dt) to determine tangential velocity. The application code instructions further cause the system to calculate the square root of the addition of the square of the radial velocity and the square of the tangential velocity. The angular swivel rate (dθ/dt) can be determined by the vector addition of the angular swivel rates in the two axes that are perpendicular to the line of sight of the LIDAR. The angular swivel rate can be provided by either a multi-axis gyroscope and/or a magnetometer.

In yet another embodiment, the application code instructions cause the system to determine absolute speed from the plurality of ranges by causing the system to further calculate an instantaneous distance (D) in the direction of motion by subtracting the square of a perpendicular distance (L), i.e. the perpendicular distance between the system and the direction of motion, e.g. determined from time of flight data, and a square of a range value (R), i.e. the direct line of sight value between the system and a moving object as based on time of flight data. The actual speed can then be calculated from a slope of the linear regression curve-fit on the time-series data of D, i.e. based on the collection of R data over a measurement time interval.

In yet another aspect, the system includes a MEMS device having a gyroscope and magnetometer communicably coupled with the processor. The system also includes a sensor communicably coupled with the processor. The sensor can be at least one of a LIDAR sensor or a RADAR detector. In addition, the application code instructions can cause the system to communicate the absolute speed by causing the system to transmit the absolute speed in a message over a network. Alternatively, or in addition thereto, the application code instructions can cause the system to communicate the absolute speed by causing the system to display the absolute speed.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 3 is a diagram depicting a LIDAR detector, object in motion, signal, distances and motion outline, and associated cosine effect realized when using the LIDAR detector in AM or MM, and in certain positions, according to certain example embodiments;

DETAILED DESCRIPTION OF PREFERRED EMBODIMENTS

The example embodiments presented herein are directed to systems, methods, and computer program products for use with either LIDAR or RADAR detectors for determining absolute speed of a moving object, in one of two methods. In a first Automatic Mode (AM) method the radial velocity of the moving object can be determined from the slope obtained by performing a linear regression curve-fit on the time-series of the time-of-flight data. The tangential velocity can be calculated by multiplying the range value with the angular velocity. With the measuring device tracking a point on the object, the angular velocity of the target track in its plane of motion with respect to the line-of-sight equals the swivel rate of the device. The absolute speed can then be determined by taking the square root of the sum of the square of the radial velocity and the square of the tangential velocity. Alternatively, in a Manual Mode (MM), the absolute speed can be determined to be the slope of the linear regression curve-fit on the time-series data of the distances, D, in the direction of motion. The instantaneous distances, D, are the square root of the subtraction of a square of a perpendicular distance (L) between the detector and a path of travel of the moving object, from a square of a line-of-sight range value (R).

As example use cases, an area of use of the improved LIDAR detector is in the area of Traffic Law-Enforcement (TLE). However, there are a myriad of other applications of the improved LIDAR. For example, monitoring potential moving violations in the area of recreational boating, support vehicles & aircraft on airport tarmacs, drones, and railcars. Enforcing a speed-limit complying environment in water bodies with recreational watercraft can improve safety. Minimizing collisions on airport tarmacs that are host to high asset value airplanes can be made possible by accurate speed measurements from any position. Ensuring that railcars travel at the prescribed speed limits in railyards helps maintain appropriately damped shunting operations at freight railroad junctions. Additionally, with the improved capability of the LIDAR, TLE officers are not constrained by disadvantageous vantage positions due to construction work, absence of roadway shoulders, obstructions, highway overpass stalking positions, and such. Furthermore, the improved detector can allow officers to be in more discrete positions that would not provide drivers advance notice to brake on sighting a targeting officer. As such, the improvement in the LIDAR or RADAR detectors can obtain speed violation boosts of as much as 20% or more even with cosine angles in the double digits. The gap between absolute and relative speeds widen with increasing cosine angle and object speeds.

Figure 1:
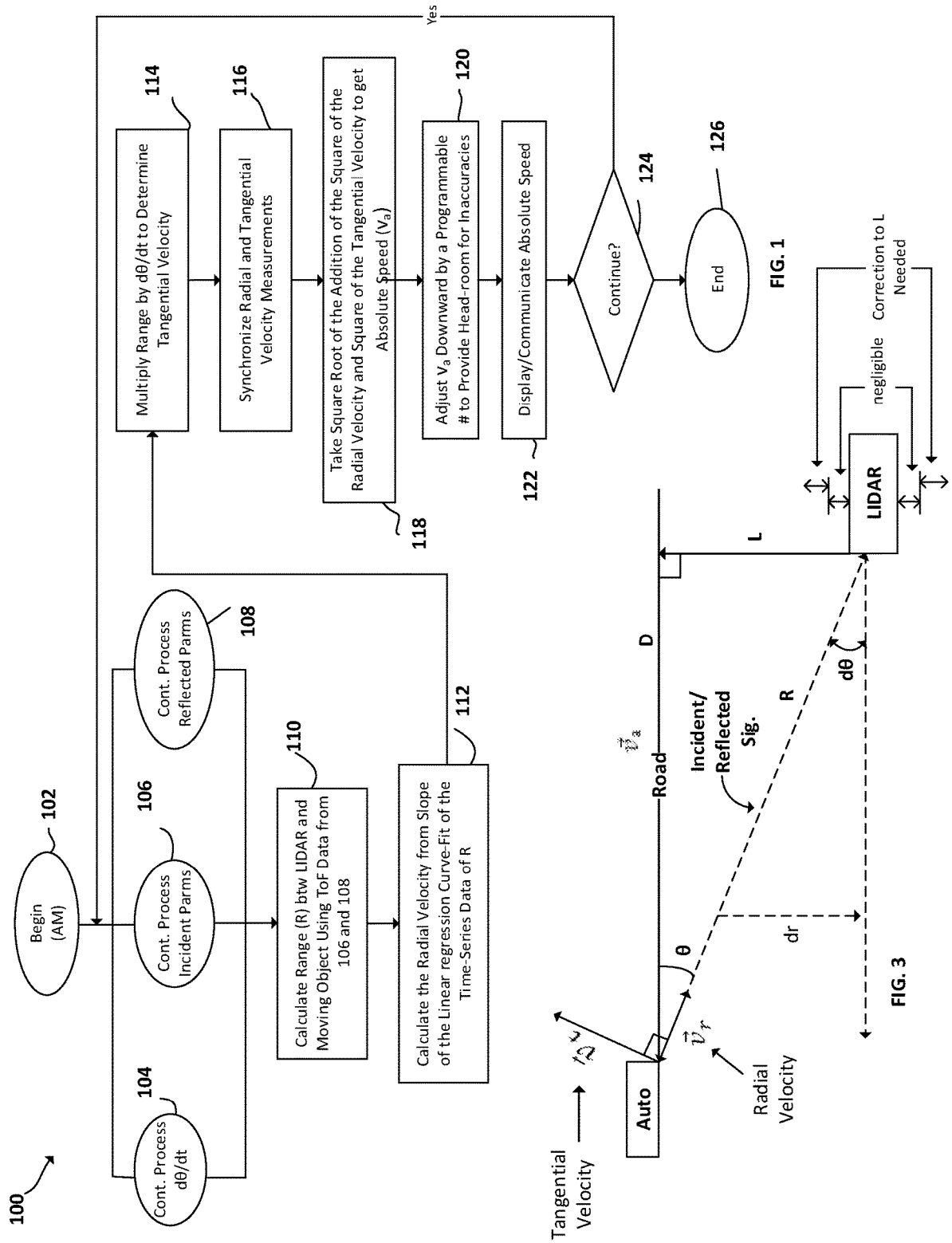
FIG. 1 is a flow chart depicting an Automatic Mode (AM) algorithm for determining absolute speed, according to certain example embodiments.

Referring now to FIG. 1, a flow chart depicting an Automatic Mode (AM) algorithm for determining absolute speed is illustrated, according to certain example embodiments, denoted generally as 100. AM algorithm 100 can be implemented in hardware or a suitable combination of hardware and software, such as in firmware operating in conjunction with one or more programmable circuit elements of a system for processing LIDAR or RADAR, such as digital signal processors, field programmable gate arrays (FPGAs), central processing units (CPUs) or the like. At block 102, the AM algorithm begins, e.g. upon powering up the system. In an example use, a LIDAR or RADAR detector implementing the use of the AM algorithm may focus the detector at an automobile moving down the road to track its speed wherein upon, e.g. in the case of the LIDAR, a laser beam is directed towards the vehicle. If the detector is not in a direct line of sight of the automobile but at an angle, the cosine effect of the angle needs to be considered in determining the absolute speed. This determination can be done by generating an angular rate ($\omega$) of the detector, e.g. by using the gyroscope and, optionally, a magnetometer wherein a weighted average of the two readings could be taken. Note that the linear component of the motion of the LIDAR detector does not impact the angular rate measurement of the object being tracked. At steps 104, 106, and 108, the angular rate ($\omega$), equation 1, incident parameters, and reflected parameters, respectively, are processed, continuously and in real-time.

$$\omega = (d\theta/dt) \qquad \text{Equation (1)}$$

Figure 4A:
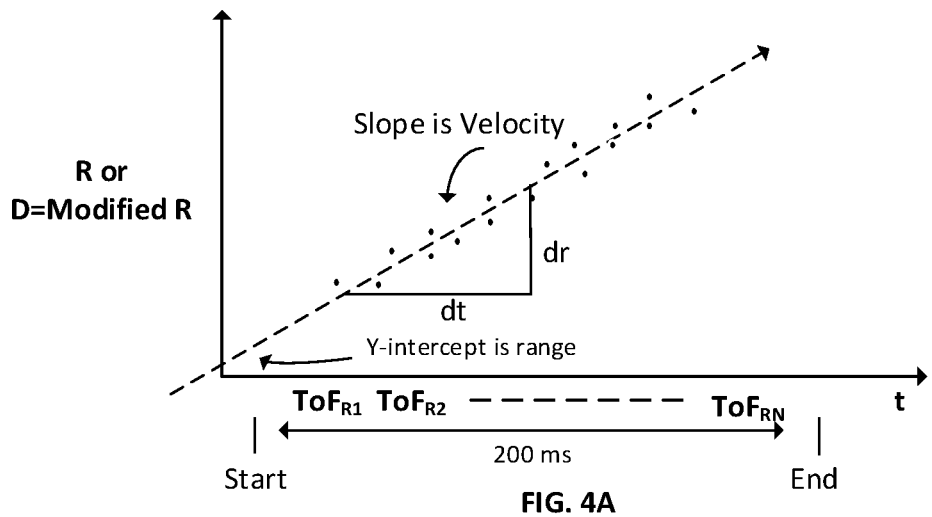
FIG. 4A is a diagram depicting a linear regression curve fit chart, according to certain example embodiments
Figure 4B:
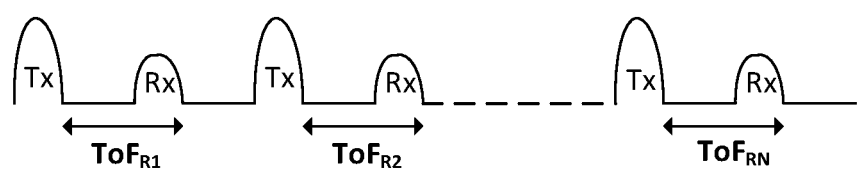
FIG. 4B is a diagram depicting a time of flight signaling data, according to certain example embodiments.

Algorithm 100 continues at block 110 where the range (R) is calculated between the LIDAR detector, e.g., and the automobile using time-of-flight data from Transmitted (Tx) and Received (RX) data, (see FIGS. 4A and 4B), derived from steps 106 and 108. Next at block 112, a linear regression curve-fit on the time series data of R from 110 is performed, and the radial speed dR/dt (equation 2) can be calculated from its slope (see FIGS. 4A and 4B).

$$\vec{v}_r = (dR/dt) \qquad \text{Equation (2)}$$

The algorithm continues at block 114 where the range (R) is multiplied by d$\theta$/dt to determine tangential velocity ($\vec{v}_t$), equation 3.

$$\vec{v}_t = R\omega = Rd\theta/dt \qquad \text{Equation (3)}$$

At block 116, the radial and tangential velocity measurements are synchronized to help mitigate time discrepancies between the two that can affect the accuracy of the absolute speed. In other words, a delay or advancement of the time-series of the tangential velocities is done to synchronize the two components. The algorithm 100 continues at block 118 where the square root is taken of the addition of the square of the radial velocity and the square of the tangential velocity to get the absolute speed, $v_a$, see equation 4.

$$|\vec{v}_a| = \sqrt{\vec{v}_r^2 + \vec{v}_t^2}$$ Equation (4)

At block 120, in case of speed enforcement where the benefit of doubt is given to the object being tracked, the calculated absolute speed can be adjusted downwards by a programmable number to a value no less than the measured radial relative speed, $v_\alpha \cos \theta$, to provide head-room for inaccuracies in angular rate measurement and time synchronization of the two orthogonal components. The algorithm 100 then continues at block 122 where the absolute speed is either displayed or communicated over a network. At block 124, the algorithm 100 determines if processing of detector data should continue. If so, the algorithm 100 returns to continue processing parameters at blocks 104, 106, and 108, otherwise the algorithm 100 ends at block 126.

FIG. 3 is a diagram illustrating a LIDAR detector targeting an automobile. Illustrated in the diagram is the tangential velocity ($\vec{v}_t$), radial velocity ($\vec{v}_r$), incident reflected signals, actual Line of Sight distance (R), i.e. range, an instantaneous distance (D), i.e. in direction of motion of the moving object, a perpendicular distance (L) between the LIDAR detector and a road where L and D intersect, and negligible and non-negligible distances for which L should or should not be recalculated. For example, movement of about 2 feet in the perpendicular direction may require update of distance L. FIG. 3 is provided to help facilitate understanding of the algorithms presented herein with respect to FIG. 1 and FIG. 2.

In this particular example, the LIDAR detector is at an angle (θ) to the instantaneous direction (D) of travel of the automobile. As a result of the cosine effect, the typically measured radial relative speed is the reduced value $v_\alpha \cos \theta$, with the reduction increasing with the value of θ. The cosine effect, $\cos \theta$, can be accounted for, using the algorithms described herein, in order to get an accurate calculation of the absolute speed at which the vehicle is traveling. The angular rate (dθ/dt) can be determined by the vector addition of the angular swivel rates in the two axes that are perpendicular to the line of sight of the LIDAR, by either: calculating the angular rate (dθ/dt); processing the angular rate (dθ/dt) received from a gyroscope; processing the angular rate (dθ/dt) from a magnetometer, or using any combination and, e.g., a weighted average to get the best results. The detected angular swivel rate time-series data can be smoothed by filtering.

Figure 2:
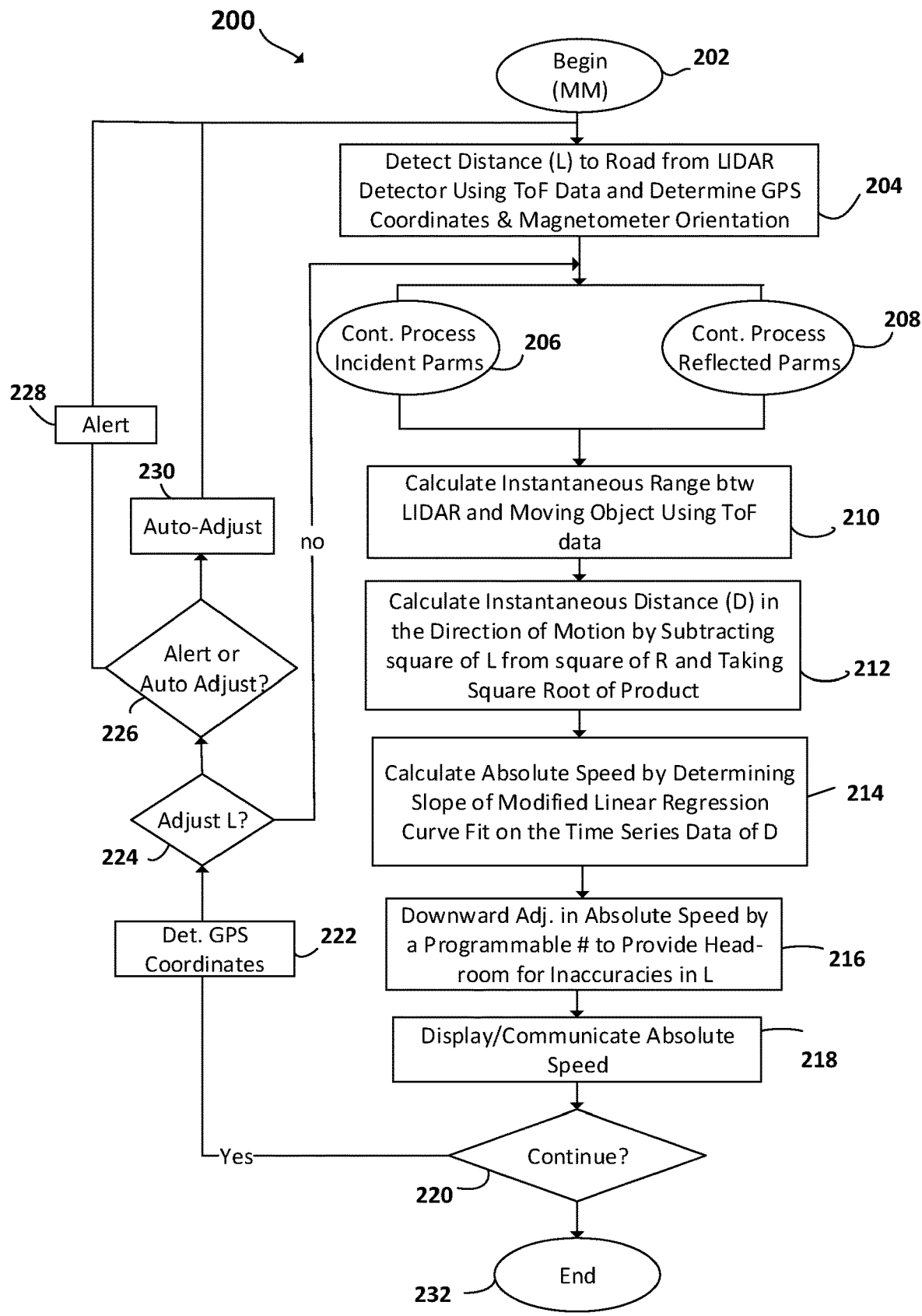
FIG. 2 is a flow chart depicting a Manual Mode (MM) algorithm for determining absolute speed, according to certain example embodiments.

Furthermore, sources that can cause inaccuracies in the measurement of the absolute speed can be caused by inaccurate measurements in the perpendicular distance L, as is used in MM that is discussed in relation to FIG. 2, and the source of measurement of the angular velocity ω, e.g. when using gyro and magnetometer, or the object being tracked is on a winding or curved road, or the automobile being tracked is changing lanes. Backing off or adjusting downwards, as described above in relation to blocks 116 and 120 and discussed in FIG. 2, can be beneficial.

In addition, if the measure of L is known, and the LIDAR is moved beyond a threshold determined by the speed accuracy tolerance after said measurement, the operator can either be notified by visual and/or audio alerts so that the measure can be retaken, or the measure can automatically be updated, e.g. using the change in location coordinates and orientation before and after movement recorded from GPS and magnetometer respectively.

Referring now to FIG. 2, a flow chart depicting a Manual Mode (MM) algorithm for detecting absolute speed is illustrated, according to certain embodiments, and denoted generally as 200. MM algorithm 200 can be implemented in hardware or a suitable combination of hardware and software, such as in firmware operating in conjunction with one or more programmable circuit elements of a system for processing LIDAR or RADAR, such as digital signal processors, field programmable gate arrays (FPGAs), central processing units (CPUs) or the like. The algorithm 200 begins at 202 wherein the algorithm is executed, e.g., when powering up or switching between AM and MM. The algorithm 200 continues when the operator of the LIDAR detector targets the road from position in order to determine the perpendicular distance (L) to the road, e.g using time of flight data for incident and reflected parameters, and capture GPS coordinates and magnetometer orientation of the LIDAR, block 204. The algorithm 200 continues processing incident parameters and reflected parameters, in block, 206 and 208, respectively, or simply just ToF data. Algorithm 200 continues at block 210 where the range (R) is calculated between the LIDAR detector, e.g., and the automobile by using ToF time series data from 206 and 208, e.g. using the same techniques described in reference to block 110 and FIGS. 4A and 4B. The algorithm 200 continues at block 212 where the instantaneous Distance (D) is calculated for each point in the curve by subtracting square of L from square of R and taking square root of product, see equation (5).

$$D = \sqrt{R^2 - L^2}$$ Equation (5)

The algorithm 200 continues at block 214 where the absolute speed is determined by applying a linear regression curve-fit to the new time-series data D, and calculating the slope of the curve-fit to determine absolute speed ($v_a$). At block 216, as was the case in the AM mode, in case of speed enforcement where the benefit of doubt is given to the vehicle, the calculated absolute speed, $v_a$, is adjusted downwards by a programmable number to a value no less than the measured radial relative speed, $v_\alpha \cos \theta$, to provide head-room for inaccuracies in the measurement of the perpendicular distance L. The algorithm 200 then continues at block 218 where the absolute speed is either displayed or communicated over a network. At block 220, the algorithm 200 determines if processing of detector data should continue, e.g is LIDAR still active or if LIDAR data is being received. If so, at block 222 the algorithm 200 captures GPS coordinates and magnetometer orientation and determines from the original captured coordinates if any change in position is present and if so, whether it is greater than a programmable threshold, block 224. If determined that the values of L does not need to be adjusted, algorithm 200 returns to continue processing ToF data, blocks 206 and 208. If it is determined that the threshold value has been exceeded, block 224, either the operator is alerted, e.g. by an alarm, a displayed message, or a combination of the two, block 226 and block 228, or the value of L is recalculated automatically using the new GPS coordinates and magnetometer orientation, block 230. Otherwise, from decision block 220, algorithm 200 can end at block 232.

In MM, it can be easier to obtain a speed track using linear regression curve-fit on the time series data of D as compared to the time-series data of R. For example, even when the object being tracked is moving at a constant velocity the time series data for D is a straight line whereas that of R follows a sinusoidal curve.

Figure 5:
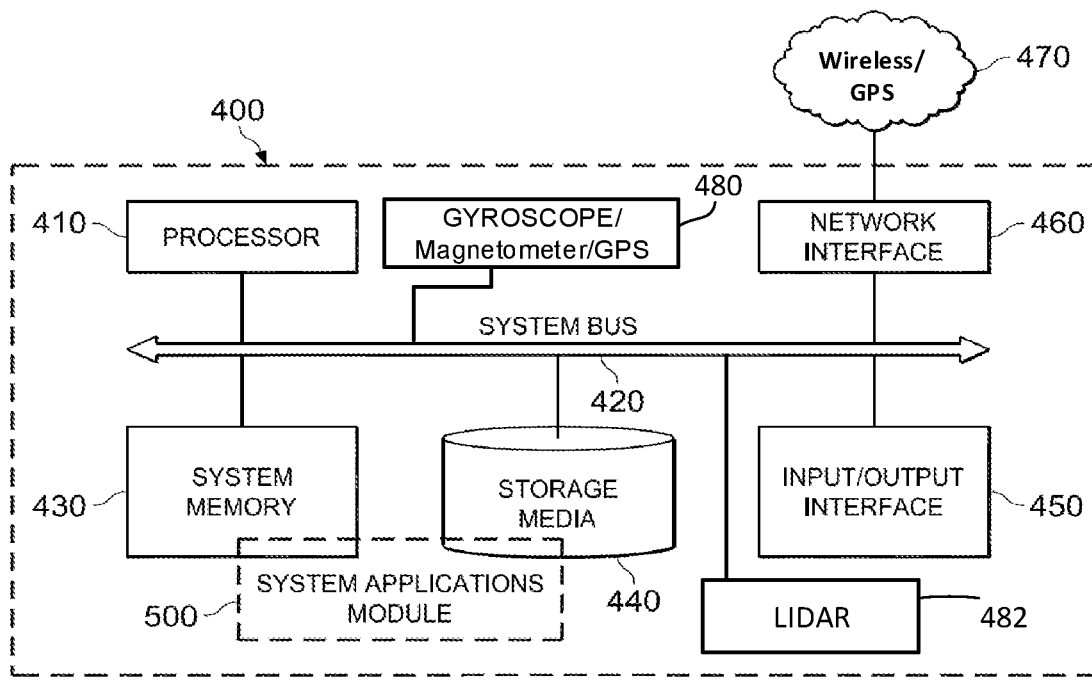
FIG. 5 is a block diagram depicting a computing machine and system applications, in accordance to certain example embodiments.

Referring now to FIG. 5, a computing machine 400 and a system applications module 500 is illustrated, in accordance with example embodiments. The computing machine 400 can correspond to any of the various computers, mobile devices, laptop computers, servers, embedded systems, or computing systems presented herein. The module 500 can comprise one or more hardware or software elements designed to facilitate the computing machine 400 in performing the various methods and processing functions presented herein. The computing machine 400 can include various internal or attached components such as a processor 410, system bus 420, system memory 430, storage media 440, input/output interface 450, a network interface 460 for communicating with a network 470, e.g. cellular/GPS, a MEMS unit 480, which can include a gyroscope, and/or magnetometer and/or GPS, and LIDAR unit 482 with appropriate laser sensors, and/or RADAR unit.

The computing machine 400 can be implemented as a conventional computer system, an embedded controller, a laptop, a server, a mobile device, a smartphone, a wearable computer, a customized machine, any other hardware platform, or any combination or multiplicity thereof. The computing machine 400 can be a distributed system configured to function using multiple computing machines interconnected via a data network or bus system.

The processor 410 can be designed to execute code instructions in order to perform the operations and functionality described herein, manage request flow and address mappings, and to perform calculations and generate commands. The processor 410 can be configured to monitor and control the operation of the components in the computing machine 400. The processor 410 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 410 can be a single processing unit, multiple processing units, a single processing core, multiple processing cores, special purpose processing cores, co-processors, or any combination thereof. According to certain embodiments, the processor 410 along with other components of the computing machine 400 can be a virtualized computing machine executing within one or more other computing machines.

The system memory 430 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 430 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 430. The system memory 430 can be implemented using a single memory module or multiple memory modules. While the system memory 430 is depicted as being part of the computing machine 400, one skilled in the art will recognize that the system memory 430 can be separate from the computing machine 400 without departing from the scope of the subject technology. It should also be appreciated that the system memory 430 can include, or operate in conjunction with, a non-volatile storage device such as the storage media 440.

The storage media 440 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 440 can store one or more operating systems, application programs and program modules, data, or any other information. The storage media 440 can be part of, or connected to, the computing machine 400. The storage media 440 can also be part of one or more other computing machines that are in communication with the computing machine 400 such as servers, database servers, cloud storage, network attached storage, and so forth.

The system applications module 500 can comprise one or more hardware or software elements configured to facilitate the computing machine 400 with performing the various methods and processing functions presented herein, i.e. algorithms 100 and 200. The module 500 can include one or more algorithms or sequences of instructions stored as software or firmware in association with the system memory 430, the storage media 440, or both. The storage media 440 can therefore represent examples of machine or computer readable media on which instructions or code can be stored for execution by the processor 410. Machine or computer readable media can generally refer to any medium or media used to provide instructions to the processor 410. Such machine or computer readable media associated with the module 500 can comprise a computer software product. It should be appreciated that a computer software product comprising the module 500 can also be associated with one or more processes or methods for delivering the module 500 to the computing machine 400 via the network 470, any signal-bearing medium, or any other communication or delivery technology. The module 500 can also comprise hardware circuits or information for configuring hardware circuits such as microcode or configuration information for an FPGA or other PLD. In one exemplary embodiment, module 800 can include algorithms capable of performing the functional operations described by the flow charts and computer systems presented herein for performing an on-line payment.

The input/output ("I/O") interface 450 can be configured to couple to one or more external devices, to receive data from the one or more external devices, and to send data to the one or more external devices. Such external devices along with the various internal devices can also be known as peripheral devices. The I/O interface 450 can include both electrical and physical connections for coupling the various peripheral devices to the computing machine 400 or the processor 410. The I/O interface 450 can be configured to communicate data, addresses, and control signals between the peripheral devices, the computing machine 400, or the processor 410. The I/O interface 450 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 450 can be configured to implement only one interface or bus technology. Alternatively, the I/O interface 450 can be configured to implement multiple interfaces or bus technologies. The I/O interface 450 can be configured as part of, all of, or to operate in conjunction with, the system bus 420. The I/O interface 450 can include one or more buffers for buffering transmissions between one or more external devices, internal devices, the computing machine 400, or the processor 410.

The I/O interface 450 can couple the computing machine 400 to various input devices including mice, touch-screens, scanners, electronic digitizers, sensors, receivers, touchpads, trackballs, cameras, microphones, keyboards, any other pointing devices, or any combinations thereof. The I/O interface 450 can couple the computing machine 400 to various output devices including video displays, speakers, printers, projectors, tactile feedback devices, automation control, robotic components, actuators, motors, fans, solenoids, valves, pumps, transmitters, signal emitters, lights, and so forth.

The computing machine 400 can operate in a networked environment using logical connections through the network interface 460 to one or more other systems or computing machines across the network 470. The network 470 can include wide area networks (WAN), local area networks (LAN), intranets, the Internet, wireless access networks, wired networks, mobile networks, telephone networks, optical networks, or combinations thereof. The network 470 can be packet switched, circuit switched, of any topology, and can use any communication protocol. Communication links within the network 470 can involve various digital or an analog communication media such as fiber optic cables, free-space optics, waveguides, electrical conductors, wireless links, antennas, radio-frequency communications, and so forth.

The processor 410 can be connected to the other elements of the computing machine 400 or the various peripherals discussed herein through the system bus 420. It should be appreciated that the system bus 420 can be within the processor 410, outside the processor 410, or both. According to some embodiments, any of the processor 410, the other elements of the computing machine 400, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Although specific embodiments have been described above in detail, the description is merely for purposes of illustration. It should be appreciated, therefore, that many algorithms or aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system for determining absolute speed of a moving object, comprising:
a storage resource;
a processor communicatively coupled to the storage resource, wherein the processor executes application code instructions that are stored in the storage resource to cause the system to:
process a plurality of time of flight data over a measurement time interval;
determine a plurality of ranges between a location associated with the system and a location associated with the moving object for each time of flight data;
determine a linear regression curve-fit on the plurality of time of flight data for the plurality of ranges between the location associated with the system and the location associated with the moving object over the measurement time interval to compensate for a cosine of an angle between a direction of the moving object and the system;
determine an absolute speed of the moving object from the linear regression curve-fit on the plurality of time of flight data that includes both radial and tangential components;
communicate the absolute speed by generating a display for a user to view the absolute speed of the moving object;
determine a radial velocity associated with the plurality of time of flight data over the measurement time interval from the slope of the linear regression curve-fit;
determine a tangential velocity for each time of flight data over the measurement time interval; and
synchronize radial and tangential velocity measurements and adjust the absolute speed downward by a programmable factor to improve accuracy in angular rate measurement and time synchronization.

2. The system of claim 1 wherein the processor executes application code instructions to determine the absolute speed by causing the system to calculate the square root of the addition of the square of the radial velocity and square of the tangential velocity.

3. The system of claim 1 wherein the processor executes application code instructions to cause the system to determine the tangential velocity by further causing the system to:
detect angular swivel rate ($d\theta/dt$) of the system relative to the moving object; and
multiply each range by the angular rate ($d\theta/dt$) to determine tangential velocity;
wherein a smoothing filter is applied to angular swivel rate data provided from at least one of a gyro and magnetometer.

4. The system of claim 3 wherein the angular swivel rate ($d\theta/dt$) is determined by the vector addition of the angular swivel rates of the measuring unit in two axes that are perpendicular to a line of sight of a LIDAR system.

5. The system of claim 3 wherein the system further includes a MEMS having an gyro and magnetometer communicably coupled with the processor.

6. The system of claim 5 wherein at least one of the gyro and the magnetometer continuously determine estimates of the angular swivel rate.

7. The system of claim 1 wherein the processor executes application code instructions to cause the system to determine absolute speed by causing the system to further:
measure a perpendicular distance (L) between the system and a direction of travel of the moving object;
calculate an instantaneous distance (D) in the direction of travel of the moving object for each range (R) by subtracting a square of a perpendicular distance (L) from a square of R and taking a square root of the result; and determine a slope of a modified linear regression curve-fit over the measurement time interval for D.

8. The system of claim 7 wherein the processor executes application code instructions to cause the system to:

auto-adjust L in response to subsequently processed GPS and magnetometer data indicating detected movement of the system beyond a programmable accuracy tolerance.

9. A computer aided method of a system for determining absolute speed of a moving object, the method comprising:

processing a plurality of time of flight data over a measurement time interval;

determining a plurality of ranges between a location associated with the system and a location associated with the moving object for each time of flight data;

determining a linear regression curve-fit on the plurality of time of flight data for the plurality of ranges between the location associated with the system and the location associated with the moving object over the measurement time interval to compensate for a cosine of an angle between a direction of the moving object and the system;

determining absolute speed;

communicating the absolute speed;

determining a radial velocity associated with the plurality of time of flight data over the measurement time interval from the slope of the linear regression curve-fit;

determining a tangential velocity for each time of flight data over the measurement time interval; and synchronize radial and tangential velocity measurements and adjust the absolute speed downward by a programmable factor to improve accuracy in angular rate measurement and time synchronization.

10. The computer-aided method of claim 9 wherein the step of determining the absolute speed further comprises calculating a square root of the addition of a square of the radial velocity and a square of the tangential velocity.

11. The computer aided method of claim 9 wherein the step of determining the tangential velocity for each time of flight data over the measurement time interval further comprises:

detecting an angular rate (dθ/dt) of the system; and multiplying each range by the angular rate (dθ/dt) to determine a tangential velocity.

12. The computer aided method of claim 9 wherein the step of determining the absolute speed from the plurality of ranges further comprises:

calculating an instantaneous distance (D) in a direction of motion of the moving object for each range (R) by subtracting a square of a perpendicular distance (L) between the system and the direction of motion of the moving object from a square of R and taking square root of the result; and determining a slope of modified linear regression curve-fit over the measurement time interval for D.

13. A non-transitory computer readable medium containing computer readable instructions for instructing a computing machine to determine absolute speed of a moving object, the computer-readable instructions comprising instructions for causing the computing machine to:

process a plurality of time of flight data over a measurement time interval;

determine a plurality of ranges between a location associated with the system and a location associated with the moving object for each time of flight data;

determine a linear regression curve-fit on the plurality of time of flight data for the plurality of ranges between the location associated with the system and the location associated with the moving object over the measurement time interval to compensate for a cosine of an angle between a direction of the moving object and the system;

determine absolute speed;

communicate the absolute speed by generating a display;

determine a radial velocity associated with the plurality of the time of flight data over the measurement time interval from the slope of the linear regression curve-fit;

determine a tangential velocity associated with the plurality of the time of flight data over the measurement time interval; and synchronize radial and tangential velocity measurements and adjust the absolute speed downward by a programmable factor to improve accuracy in angular rate measurement and time synchronization.

14. The non-transitory computer readable medium of claim 13 wherein the absolute speed is determined by causing the system to calculate the square root of the addition of the square of the radial velocity and a square of the tangential velocity.

15. The non-transitory computer readable medium of claim 13 wherein the computer readable instructions to cause the computing machine to determine the tangential velocity further includes instructions to the cause the computing machine to:

detect an angular swivel rate (dθ/dt) of the system; and multiply each range by the angular rate (dθ/dt) to determine a tangential velocity.

16. The non-transitory computer readable medium of claim 13 wherein the computer readable instructions to cause the computing machine to determine the absolute speed further includes computer readable instructions to cause the computing machine to:

measure a perpendicular distance (L) between system and a direction of travel of the object;

calculate an instantaneous distance (D) in the direction of travel of the object for each range (R) by subtracting a square of a perpendicular distance (L) from a square of R and taking a square root of a result; and determine a slope of a modified linear regression curve-fit over the measurement time interval for D.

* * * * *